United States Patent [19]

Nyman et al.

[11] Patent Number: 5,337,375

[45] Date of Patent: Aug. 9, 1994

[54] DEPOLARIZER USING UNPUMPED, DOPED OPTICAL FIBER AND METHOD USING SAME

[75] Inventors: Bruce M. Nyman, Freehold Township, Monmouth County; Gregory M. Wolter, Oakhurst, both of N.J.

[73] Assignee: AT&T Bell Laboratories, Murray Hill, N.J.

[21] Appl. No.: 999,080

[22] Filed: Dec. 31, 1992

[51] Int. Cl.$^5$ ............................. G02B 6/10; H01S 3/30
[52] U.S. Cl. ................................. 385/11; 385/27;
385/29; 385/31; 385/38; 385/123; 385/141;
385/142; 372/6; 359/333; 359/341; 359/342;
359/483
[58] Field of Search ............... 385/122, 141, 142, 11,
385/15, 27, 28, 29, 31, 39, 123, 38; 372/6;
359/333, 342, 343, 345, 346, 349, 483, 494, 498,
499, 500

[56] References Cited

U.S. PATENT DOCUMENTS

| | | | |
|---|---|---|---|
| 4,606,605 | 8/1986 | Ashkin et al. | 385/11 X |
| 4,711,525 | 12/1987 | Feth | 385/11 X |
| 4,763,972 | 8/1988 | Papuchon et al. | 385/11 X |
| 4,923,279 | 5/1990 | Ainslie et al. | 372/6 |
| 5,044,713 | 9/1991 | Mozer et al. | 385/11 |
| 5,117,303 | 5/1992 | Desurvire et al. | 359/341 |
| 5,131,069 | 7/1992 | Hall et al. | 385/142 |
| 5,134,517 | 7/1992 | Marcerou et al. | 359/341 |
| 5,198,921 | 3/1993 | Aoshima et al. | 359/248 |
| 5,216,728 | 6/1993 | Charlton et al. | 385/27 |
| 5,218,652 | 6/1993 | Lutz | 385/11 |
| 5,268,910 | 12/1993 | Huber | 372/6 |
| 5,276,549 | 1/1994 | Tagawa et al. | 359/341 |

OTHER PUBLICATIONS

"Proposal for a Fiber-Optic Endlessly Rotatable Fractional Wave Device and its Applications to Lightwave Technologies" T. Matsumoto, et al., Electronics and Communications in Japan, Part 2, vol. 71, No. 6, 1988.

Primary Examiner—Brian Healy
Attorney, Agent, or Firm—Eli Weiss; Stuart H. Mayer

[57] ABSTRACT

Previous efforts to measure polarization dependent loss of optical components have been limited in uncertainty to more than 0.01 dB. This is because the power meter used in a test set contains polarization dependent loss which adversely affects the final readings. It is here disclosed that an unpumped erbium doped fiber can convert a received polarized signal into unpolarized amplified spontaneous emission of a longer wavelength if the fiber is of sufficient length to absorb the received signal. By locating the inventive unpumped erbium doped fiber upstream of the power meter of a test set, the polarized signal to the power meter is coverted to an unpolarized signal and, therefore, the polarization dependent loss of the power meter can not influence the measurement obtained.

12 Claims, 2 Drawing Sheets

DEPOLARIZER USING UNPUMPED, DOPED OPTICAL FIBER AND METHOD USING SAME

TECHNICAL FIELD

This invention relates generally to a depolarizer. More particularly, this invention relates to a depolarizer within a test set for measuring polarization dependent loss of optical components.

BACKGROUND OF THE INVENTION

Optical amplifier systems normally require optical devices such as optical isolators, optical couplers and the like which have varying levels of polarization dependent loss. Polarization Dependent Loss (PDL) can be defined as the variation in insertion loss as a function of the polarization of an input signal to an optical device. For optical amplifier systems that use optical components, the polarization dependent loss of the various optical components or devices can result in signal degradation. Presently, polarization dependent loss measurements of optical devices are obtainable to an accuracy 0.01 dB. To minimize the cumulative polarization dependent loss due to optical components which are present in an optical transmission system, a more accurate measurement of the polarization dependent loss of the various optical components is needed. This invention is directed toward solving this problem.

SUMMARY OF THE INVENTION

It is here disclosed that an unpumped erbium doped fiber can convert received polarized energy such as that which is generated by a laser into unpolarized amplified spontaneous emission of a longer wavelength if the fiber is of sufficient length to absorb the received polarized signal. It is our understanding that the conversion of polarized light into unpolarized light occurs for the following reason. When polarized light which lies within the erbium absorption band is received by a length of unpumped erbium doped fiber, the received light acts as a pump and excites the erbium atoms. These excited atoms return to the ground state by emitting lower energy photons which have a longer wavelength. If the emitted photons are still within the erbium absorption band, the process is repeated. Thus, amplified spontaneous emission is generated at successively longer wavelengths and the unpumped doped fiber becomes a depolarizer. When the fiber has a length which is long enough to completely absorb the received signal, longer wavelength unpolarized amplified spontaneous emission is generated.

In an embodiment, the inventive depolarizer is used in a test set to measure accurately the polarization dependent loss of an optical device. Previous efforts to measure polarization dependent loss of passive optical devices have been limited because of the polarization dependent loss which is present in the measuring equipment. With a test set which includes the inventive depolarizer, the polarization dependent loss of the measuring equipment never enters into the measured result.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Polarization dependent loss of optical components in optical transmission systems is a primary cause of signal degradation. In an optical transmission system that spans thousands of kms and where the system includes many optical components periodically located along the transmission path, a polarization dependent loss of 0.01 dB per optical component can adversely affect the quality of the signal.

To provide an optical transmission system that is minimally affected by polarization dependent loss, it is necessary that each of the optical components in the transmission path exhibit minimum polarization dependent loss.

It has been determined that current efforts to more accurately measure polarization dependent loss of optical components is limited by the polarization dependent loss present in the measuring equipment. Therefore, to accurately measure the polarization dependent loss of an optical component, the polarization dependent loss of the measuring equipment must be eliminated. It has been determined that there are three major sources of variability or polarization dependent loss in todays measuring equipment. The first is the stability of the laser. The second is bend loss associated with adjustments of the manual polarization controller. The third is the polarization dependent loss of the detector. By reducing the effects of each of these three sources or causes of polarization dependent less, high accuracy measurements can be obtained.

Figure 1:
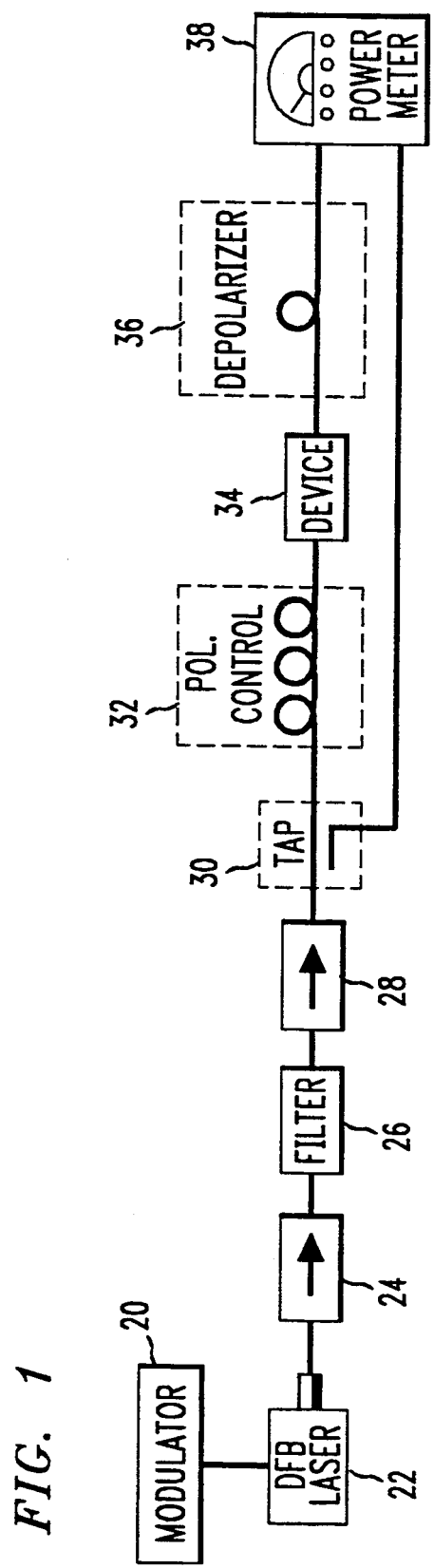
FIG. 1 is a block diagram of a test set for measuring the polarization dependent loss of optical components using a depolarizer in accordance with the principles of the invention.

Referring to FIG. 1, there is illustrated an arrangement for measuring the polarization dependent loss of an optical component in accordance with the principles of the invention. A signal source 22 which can be a DFB laser generates optical energy that lies within the absorption bandwidth of an erbium doped fiber 36 located downstream of an optical component 34 that is to be tested and upstream of a test or power meter 38. The stability of the laser can effect the precision of the test results. To provide a stable output signal, the laser 22 can have an integral cooler and can be coupled to a modulator 20. The modulator modulates the laser at 10 MHz to reduce the coherence length of the laser 22. With this arrangement the laser stability obtained was found to be less than 0.002 dB variation in a 2-minute interval. The DFB laser 22 is spliced to an optical isolator 24 which, in turn, is spliced to a 1.5 nm bandpass angle tuned interference filter 26. The filter 26 reduces the amplified spontaneous emission from the laser. In those instances where the DFB laser does not have long wavelength amplified spontaneous emission, the filter 26 can be eliminated.

The filter 26 is spliced to a second optical isolator 28 which, in turn, is spliced to an optical tap 30 having two outputs. One output of the tap is connected directly to power meter 38 which can be a Hewlett Packard 8153A power meter. The signal which is applied from the optical tap directly to the power meter is the reference signal. Measurements with the power meter are made in a ratio mode using the reference signal to account for slow drifts in the components of the test apparatus. The other output of the optical tap is connected to an all fiber manual polarization controller 32. Bend loss associated with adjustments of the polarization controller is eliminated by using optical fibers that have small mode field diameters. The output of the all fiber manual polarization controller is spliced to the optical component 34 that is to be tested. The output of the optical component that is to be tested is spliced to the unpumped erbium doped fiber 36 which operates as a depolarizer. The output of the depolarizer 36 is spliced to the power meter 38. In the arrangement of components recited above, all fiber connections are fusion spliced to avoid reflections; and, all optical fibers are securely positioned to avoid the polarization state of the various fibers from changing during a measurement.

In operation, the depolarizer 36 converts the received polarized signal to amplified spontaneous emission which is not polarized. Thus, the power meter receives and measures unpolarized light to determine the polarization dependent loss of the optical component being tested. As the light which is received by the power meter is not polarized, the polarization dependent loss of the power meter does not influence the measurement obtained.

The use of the depolarizer 36 to eliminate the power meter polarization dependent loss in a test set is a major improvement over the prior art. The inventive depolarizer here disclosed is an unpumped erbium doped fiber.

Normally, erbium doped fiber is used as an optical amplifier in fiber transmission systems. Amplification of signals between 1530 and 1565 nm occurs when the erbium doped fiber is pumped at either 1480 nm or 980 nm. With no input signal, a pumped erbium doped fiber produces unpolarized Amplified Spontaneous Emission over a broad range of from 1500 nm to 1600 nm.

In one test, the effectiveness of the erbium doped optical fiber depolarizer was examined. The test set was first characterized without a depolarizer. With no optical component connected, the residual polarization dependent loss was found to be 0.01 dB. But, with the inventive unpumped erbium doped fiber depolarizer in place, the residual polarization dependent loss was found to be 0.001 dB. It is to be noted that to obtain this value, care was exercised in the installation of the test set fibers since polarization dependent loss of 0.005 dB can be obtained with subtle bends in the fibers. In this instance, measurements were made at both 1558 nm and 1480 nm, with identical results.

Figure 2:
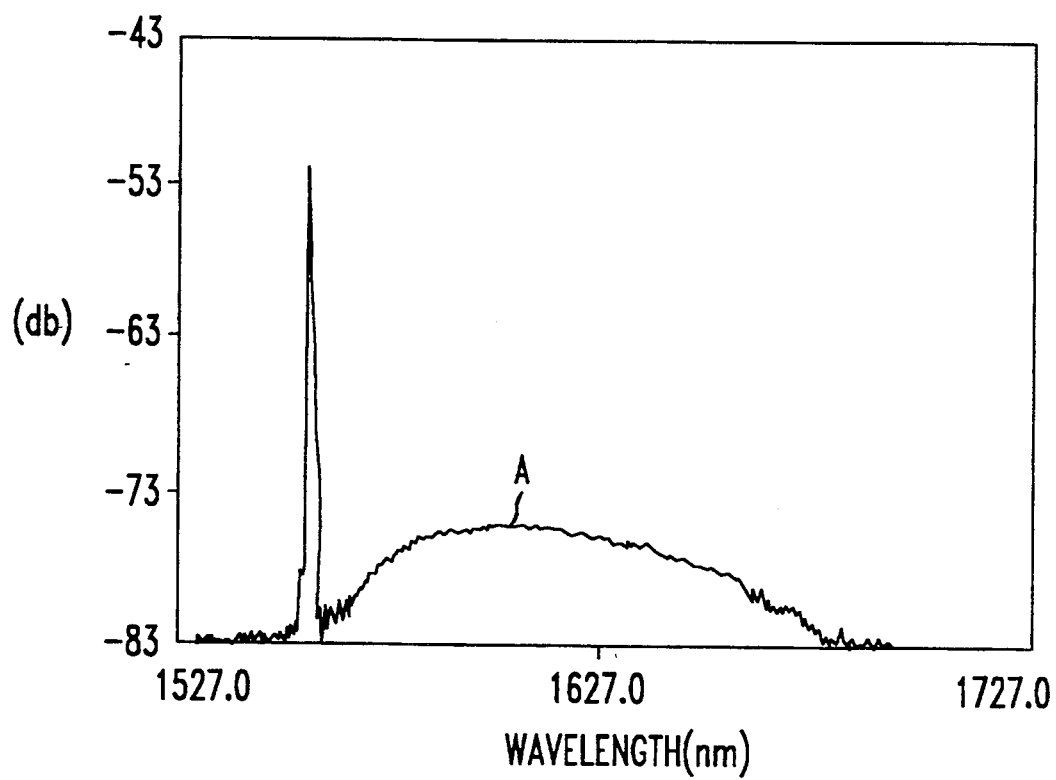
FIG. 2 is a graph of the optical signal in a short length of an unpumped erbium doped fiber where the input signal is not completely depolarized.
Figure 3:
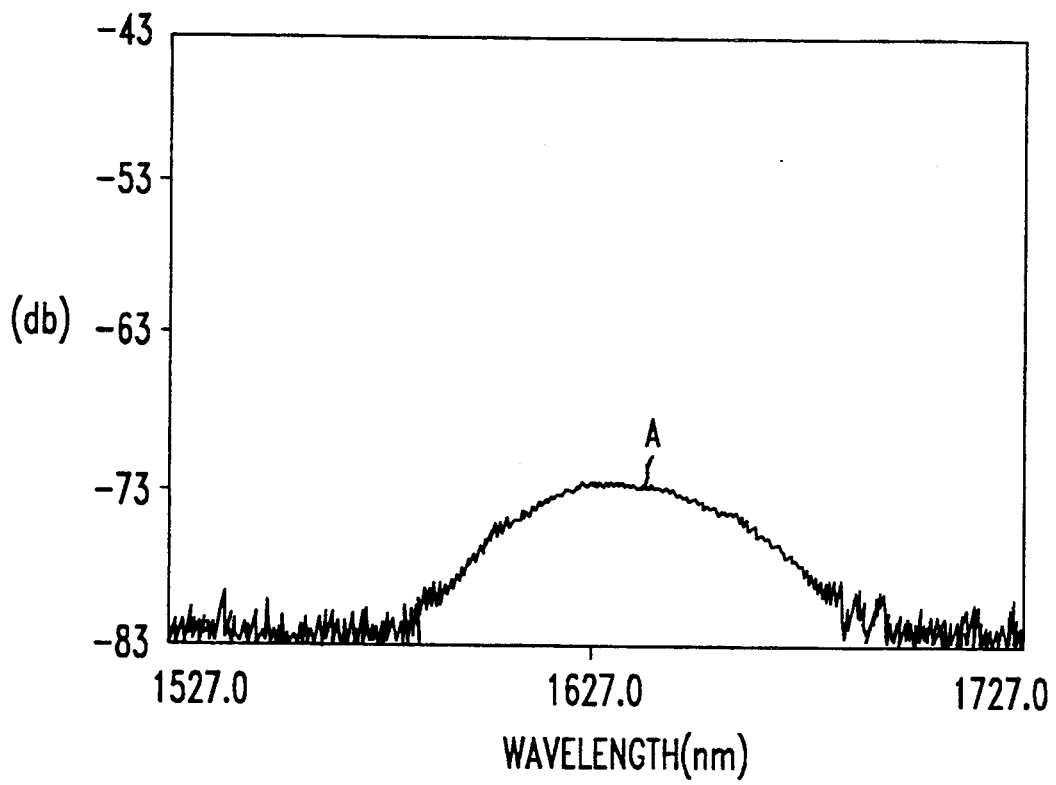
FIG. 3 is a graph of the optical signal in a length of unpumped erbium doped fiber where the input signal is completely depolarized.

It is our understanding that the following occurs when light in the erbium absorption band is input to a long length of unpumped erbium doped fiber. Initially the light acts as a pump and excites the erbium atoms. These excited atoms return to the ground state by emitting lower energy (longer wavelength) photons and, if the emitted photons are within the erbium absorption band, the process is repeated. Thus, amplified spontaneous emission is generated at successively longer wavelengths. If the fiber is sufficiently long, the input signal is completely absorbed and longer wavelength unpolarized amplified spontaneous emission is generated. For example, polarized light at 1558 nm is converted to broadband unpolarized amplified spontaneous emission at wavelengths that are longer than 1600 nm. Referring to FIG. 2, there is illustrated the partial conversion of a polarized optical signal into unpolarized amplified spontaneous emission for a short length of erbium doped fiber. In FIG. 2, the sharp spike is the received polarized signal and curve A is the generated amplified spontaneous emission. Referring to FIG. 3, there is illustrated the complete conversion of a received polarized optical signal into unpolarized amplified spontaneous emission for a length of unpumped doped optical fiber where the input signal is completely depolarized. In FIG. 3 there is no spike input signal because it has been completely absorbed. Curve A is the generated amplified spontaneous emission.

In the embodiment of the test set disclosed in FIG. 1, an unpumped erbium doped fiber is included as a depolarizer of a test set for measuring the polarization dependent loss of an optical device. While the embodiment disclosed in FIG. 1 illustrates the use of an erbium doped fiber as the depolarizer, it is to be understood that the optical fibers can be doped with other material such as neodymium which can be used for other wavelengths. In addition, while the depolarizer is described in combination with a test set for measuring the insertion loss of an optical component, it is obvious that the unpumped optical fiber can be used as a depolarizer for other applications such as, for example, in fiber gyros which use depolarized light.

It will thus be appreciated that those skilled in the art will be able to devise numerous arrangements which, although not explicitly shown or described herein, embody the principles of the inventions. Accordingly, all such alternatives, modifications and variations which fall within the spirit and broad scope of the appended claims will be embraced by the principles of the invention.

We claim:

1. A depolarizer comprising an unpumped doped optical fiber, the fiber having a prescribed length sufficient to absorb an applied polarized signal to produce, from the applied signal, unpolarized amplified spontaneous emission of longer wavelengths.

2. The depolarizer of claim 1 wherein said prescribed length is sufficient to completely absorb the applied signal.

3. The depolarizer of claim 1 wherein said optical fiber is doped with erbium.

4. The depolarizer of claim 1 wherein said optical fiber is doped with neodymium.

5. A test set for measuring polarization dependent loss of an optical component comprising
   a signal source for generating a polarized signal,
   an optical isolator coupled to receive the signal from the signal source,
   an optical tap coupled to divide the optical signal from the optical isolator into a first signal and a second signal,
   a polarization controller coupled to receive the first signal from the optical tap,
   an unpumped doped optical fiber coupled to receive the first signal from the polarization controller, the unpumped doped optical fiber having a length sufficient to absorb fully the received first signal and produce from the received first signal unpolarized amplified spontaneous emission of longer wavelength.
   a power meter coupled to receive the second signal from the optical tap and the unpolarized amplified spontaneous emission from the unpumped doped optical fiber, and means to locate an optical component whose polarization dependent loss is to be measured between the polarization controller and the unpumped doped optical fiber.

6. The test set of claim 5 wherein
said unpumped doped optical fiber is doped with erbium.

7. The test set of claim 5 wherein
said unpumped doped optical fiber is doped with neodymium.

8. The test set of claim 6 wherein said signal source comprises
a laser.

9. The test set of claim 8 further comprising
a modulator coupled to modulate said laser.

10. The test set of claim 9 further comprising
an interference filter interposed between the optical isolator and the optical tap, and
a second optical isolator interposed between the interference filter and the optical tap.

11. A method of depolarizing a polarized signal comprising the step of:
applying a polarized signal to an unpumped doped optical fiber, said fiber having a prescribed length sufficient to absorb the applied polarized signal to produce, from the applied signal, unpolarized amplified spontaneous emission of longer wavelengths.

12. An apparatus for measuring polarization dependent loss of an optical component comprising:
a signal source for generating a polarized signal;
a polarization controller coupled to receive the polarized signal;
a depolarizer coupled to receive the polarized signal from the polarization controller to generate a depolarized signal;
means for measuring the power of the depolarized signal; and
means for locating an optical component whose polarization dependent loss is to be measured between the polarization controller and the depolarizer.

* * * * *